Patented June 17, 1941

2,245,783

UNITED STATES PATENT OFFICE 2,245,783

METHOD OF COLORING GLASS FIBERS

James Franklin Hyde, Corning, N. Y., assignor, by mesne assignments, to Owens-Corning Fiberglas Corporation, a corporation of Delaware No Drawing. Application July 16, 1937, Serial No. 154,101

5 Claims. (Cl. 8—8)

This invention relates to glass fibers and to processes embodying chemical treatments of glass fibers for various purposes.

The object of the invention is to alter the chemical compositions of silicious substances and aqueous solutions, so as to soften hard water, color glass fibers, and increase the electrical and weathering resistance of fibrous silicates.

The above and other objects may be accomplished by practicing my invention which embodies among its features treating the fibers with a solution containing ions which will be absorbed into the glass.

A further embodiment of the invention consists in treating the glass fibers with another solution containing ions which will also be absorbed in the glass and which may replace the ions first absorbed or may combine therewith to produce a compound within the glass. Such combined ions or compounds may under certain circumstances produce a coloration in the glass fibers.

I have discovered that glass fibers when immersed in or contacted with aqueous solutions containing metallic ions such as solutions containing salts of magnesium, calcium, zinc, cadmium, copper, silver, lead, tin, aluminum, cobalt, iron, etc., will absorb a substantial amount of such ions from the solution. Such absorption appears to be a base exchange or a replacement or substitution of basic constituents of the glass such as alkali or alkaline earth metals by the metallic ions of the solution. For example, glass fibers made from a soda lime glass having a total alkali content of 16.7% and containing substantially no zinc oxide were immersed in a 5% aqueous solution of zinc chloride for one week. At the end of this time analysis showed that the fibers had a total alkali content of 4.11% and contained 5.36% ZnO. A similar treatment with a 5% solution of stannic chloride gave the following result on analysis: 4.07% total alkali and 6.46% $SnO_2$. The unexpected extent of this reaction is probably due to the extremely large surface area of glass exposed in the fibrous form as compared with the relatively small surface area of the glass when in massive form.

The above reactions are, to a large extent at least, reversible and glass fibers which have been so treated and which have absorbed metal ions in exchange for basic constituents of the glass will revert substantially to their original composition or will lose substantially all of the absorbed metallic ions when the impregnated fibers are treated with a solution of an alkali salt such as sodium chloride. For example, when glass fibers are immersed for a time in a solution of calcium sulfate or calcium chloride, a substantial amount of the calcium is absorbed by the glass and some of the alkali of the glass is liberated into the solution. When the treated fibers are washed and immersed in a solution of sodium chloride the absorbed calcium is removed from the glass and sodium is returned thereto. In the same manner hard water containing natural salts of calcium and/or magnesium may be softened, that is, the calcium and magnesium may be substantially removed from the water by passing the water slowly through a suitable container packed with glass fibers. The glass fibers may subsequently be rejuvenated by soaking in sodium chloride solution followed by washing. Such a cycle of reactions may be repeated indefinitely. In fact the softening action of glass fibers on hard water is improved if the fibers are given a preliminary treatment with 5% calcium chloride solution followed by rejuvenation with sodium chloride solution. From this it follows that glass fibers either alone or in combination with known water softening agents may be used to advantage in apparatus for softening water.

Glass fibers which have been treated with salt solutions of certain metals have been found to have an increased electrical surface resistance. For example, glass fibers were treated by being immersed in a 5% aqueous copper acetate solution for twenty-four hours. After such treatment no visible change had occurred in the fibers but the electrical resistance for an arbitrary unit surface area was found to have increased from about five megohms to about one million megohms. Treatment with a 5% solution of lead nitrate produces a similar result. Other soluble salts of these metals, such as chloride, sulfate, nitrate, etc., likewise have a similar effect. While the reason for this phenomenon is not definitely known, it is believed that the alkali ions in the surface layers of the glass are replaced by the copper or lead ions of the solution thereby removing from the surface layer of the glass the alkali which is ordinarily effective in producing surface conductivity and which is ordinarily known as free surface alkali. That the replacement of one metal by another should produce such a marked change in electrical conductivity is assumed to be due to the fact that only the alkali metal compounds are appreciably dissociated in glass at room temperature and that other metals such as copper and lead do not exist under these conditions as dissociated ions capable of conducting electricity but form undissociated compounds which have little if any appreciable conductivity. The effect of the treatment with copper acetate is apparently permanent, which indicates that it is not a superficial surface effect but that it extends into the body of the glass because other treatments, such as washing glass fibers with water or with acids thereby removing free surface alkali, do not produce any lasting improvement in the resistance. Glass fibers, which have been treated in accordance with my invention and which have an increased electrical resistance, are particularly suitable as textile fibers in making insulating braid and fabric for covering wires and other electrical conductors.

Glass fibers which have been treated with salt solutions of copper and lead also have an increased stability or resistance to weathering, that is, they are not affected by atmospheric conditions as are glass fibers which have not been so treated. For example, glass fibers were immersed for about twenty hours in distilled water in a 5% solution of copper acetate and a 5% solution of lead nitrate respectively. They were then washed thoroughly and kept for one week in an atmosphere of 100% relative humidity at 40° C. This was followed by extraction with water at room temperature for two minutes and titration of the extract with N/100 sulfuric acid with methyl red indicator. The result calculated as per cent $Na_2O$ for the three samples was .13% for the distilled water treatment, .02% for the copper acetate treatment, and .01% for the lead nitrate treatment respectively. This shows that the alkali liberated by the accelerated weathering treatment or exposure to high humidity is considerably greater when the fibers have not been treated with copper or lead salts and that the treatment with such salts increases the weathering resistance substantially ten-fold.

I have further found that glass fibers which have been treated with a solution of a metallic salt and have absorbed a metallic ion therefrom may, on subsequent treatment with another solution containing a suitable anion, absorb the anion without substantial loss of the metallic ion first absorbed and that the absorbed anion may react or combine with the metallic ion to form a compound within the glass. By the use of proper solutions containing ions which, on combination, form a colored compound or complex, it is possible to color or dye glass fibers with inorganic pigments which are substantially permanent against the action of light and chemical reagents. As examples of this feature of my invention the following processes are given:

*Example I.*—Yarn made of glass fibers was treated by being immersed in a 5% solution of lead acetate in water at 85° C. for twenty-four hours. It was then washed with water and treated with a 2% solution of potassium dichromate at room temperature. The yarn was colored yellow by the formation of lead chromate in the glass fibers.

*Example II.*—Yarn was treated with a 5% solution of lead acetate in water at 85° C. for forty-eight hours and was subsequently dipped into a dilute solution of ammonium sulfide. The yarn was colored dark brown by the formation of lead sulfide in the glass fibers.

*Example III.*—Yarn was treated with a 5% lead acetate solution at 85° C. for forty-eight hours and was subsequently dipped into a dilute chromic acid solution. It was colored yellow due to the formation of lead chromate in the glass fibers.

*Example IV.*—Yarn was treated with a 3% solution of ferrous sulfate at 85° C. for about one-half hour and was subsequently treated with a warm dilute solution of sodium carbonate for five minutes. A light orange color resulted which was probably due to the formation of a basic iron compound.

*Example V.*—Yarn was treated with a 3% solution of ferrous sulfate at 85° C. for about one-half hour and was subsequently treated with a warm 1% solution of potassium ferrocyanide acidified with hydrochloric acid. Prussian blue was formed in the glass fibers thereby coloring them a dark blue.

In like manner other colors may be produced by the formation of colored pigments within the fibers and with a given pigment different degrees of color saturation or color density may be obtained by varying the length of time of treatment or the concentrations of the solutions producing such pigment. Moreover, in obtaining the pigments according to the above recited examples practically any soluble salts may be employed whose solutions will furnish the ions required to produce the respective pigments. Yellow hues may be produced by a primary treatment with a solution of a cadmium salt followed by treatment with hydrogen sulfide or ammonium sulfide. Various shades of brown are obtained by treatment with a solution of a silver salt followed by treatment with a solution of a sulfide. Many other combinations for producing colored pigments within the glass fibers will suggest themselves to anyone familiar with such reactions.

Some metals such as manganese and silver, on being absorbed into the glass fibers, will produce directly a coloration therein without the subsequent absorption of an anion into the glass or any other treatment of the glass fibers.

*Example VI.*—Yarn which was treated with a hot 2% solution of manganese sulfate for twenty-four hours was colored light tan.

*Example VII.*—Yarn which was treated with 2% potassium permanganate solution for one hour at room temperature was colored light tan.

I have also found that many organic dyes and particularly dyes of the basic type are absorbed by glass fibers when the latter are treated with solutions thereof. It is believed that in this case also a base exchange occurs which enables the dye to penetrate the body of the fiber. As examples of such reactions the following are given:

*Example VIII.*—Yarn composed of glass fibers when immersed for about one hour in a hot .25% solution of "Phosphine ACR" dye is colored bright orange.

*Example IX.*—Yarn treated for about one hour with a hot .25% aqueous solution of "National Methylene Blue 2B" dye is colored blue.

*Example X.*—Yarn treated for about one hour with a hot .25% aqueous solution of "National Brilliant Green B Crystals" is colored light green.

*Example XI.*—Yarn treated for about one hour with a hot .25% aqueous solution of "National Crystal Violet 6B" dye is colored violet.

In some instances I have found it advantageous first to cause the absorption into the fibers of a metallic ion before treatment with organic dyes. In such cases the metallic ions seem to have a mordanting action. Metals which are particularly suitable for this purpose are zinc and magnesium. The following examples illustrate the use of organic dyes on glass fibers in which a metal ion has been absorbed through base exchange.

*Example XII.*—Yarn was treated with a 2.5% solution of zinc nitrate at about 85° C. for forty-eight hours and was then immersed for about ten minutes in a hot .25% aqueous solution of "Alkali Blue 6B" dye. A blue color was obtained in the glass fiber.

*Example XIII.*—Yarn was treated with a hot 2.5% solution of magnesium nitrate for forty-eight hours and was then immersed for ten minutes in a hot .35% aqueous solution of "Alkali Blue 6B" dye. A blue color was obtained.

*Example XIV.*—Yarn was treated with a hot 2.5% solution of magnesium nitrate for forty-eights hours and was then immersed for ten minutes in a .25% aqueous solution of "Luxol Fast Scarlet C" dye. A pink color was obtained.

*Example XV.*—Yarn was treated with a hot 2.5% solution of magnesium nitrate for forty-eight hours and was then immersed for ten minutes in a .35% aqueous solution of iodeosin. A pink color was obtained.

Although most organic dyes are not fast against the action of actinic light, they are entirely suitable for use in glass fibers that will not be exposed to such action and they possess the advantage of producing certain tints and pastel colors that cannot be obtained through the use of inorganic pigments.

I claim:

1. The method of coloring fibers composed of glass containing a first group metal which includes treating them with an ionizable salt of a metal of a higher group to displace a portion of the said first group metal and subsequently reacting the higher group metal with an additional material containing an ion capable of forming a pigment therewith, whereby a pigment is formed and incorporated within the fibers.

2. The method of coloring fibers composed of glass containing a first group metal which includes treating them with an ionizable salt of a metal of a higher group to displace a portion of the said first group metal and subsequently reacting the higher group metal with an additional inorganic material containing an ion capable of forming a pigment therewith, whereby a pigment is formed and incorporated within the fibers.

3. The method of coloring fibers composed of glass containing a first group metal which includes treating them with an ionizable salt of a metal of a higher group to displace a portion of the said first group metal and subsequently reacting the higher group metal with an organic dye capable of forming a pigment therewith, whereby a pigment is formed and incorporated within the fibers.

4. The method of coloring fibers composed of glass containing a first group metal which includes treating them with an ionizable salt of zinc to displace a portion of the said first group metal and subsequently reacting the zinc with an organic dye capable of forming a pigment therewith, whereby a pigment is formed and incorporated within the fibers.

5. The method of coloring fibers composed of glass containing a first group metal which includes treating them with an ionizable salt of magnesium to displace a portion of the said first group metal and subsequently reacting the magnesium with an organic dye capable of forming a pigment therewith, whereby a pigment is formed and incorporated within the fibers.

JAMES FRANKLIN HYDE.